United States Patent [19]

Matsushita et al.

[11] Patent Number: 4,742,805
[45] Date of Patent: May 10, 1988

[54] INTERNAL COMBUSTION ENGINE

[75] Inventors: Yukio Matsushita; Hiroshi Tomita, both of Hamamatsu, Japan

[73] Assignee: Sanshin Kogyo Kabushiki Kaisha, Hamamatsu, Japan

[21] Appl. No.: 84,926

[22] Filed: Aug. 13, 1987

[30] Foreign Application Priority Data

Aug. 14, 1986 [JP] Japan ................................ 61-191088
Aug. 28, 1986 [JP] Japan ................................ 61-202278

[51] Int. Cl.⁴ .................... F02B 19/00; F02B 75/98
[52] U.S. Cl. ..................... 123/270; 123/256; 123/257
[58] Field of Search ............... 123/270, 256, 260, 276, 123/257

[56] References Cited

U.S. PATENT DOCUMENTS

| | | | |
|---|---|---|---|
| 1,759,162 | 5/1930 | Lang | 123/256 |
| 2,868,181 | 1/1959 | Dolza | 123/257 |
| 4,175,531 | 11/1979 | Tanahashi | 123/256 |
| 4,175,533 | 11/1979 | Goto et al. | 123/256 |
| 4,186,692 | 2/1980 | Kawamura | 123/270 |
| 4,325,334 | 4/1982 | Nishida et al. | 123/270 |
| 4,401,072 | 8/1983 | Ito et al. | 123/256 |
| 4,511,612 | 4/1985 | Huther et al. | 123/270 |
| 4,522,171 | 6/1985 | Dworak et al. | 123/270 |
| 4,562,807 | 1/1986 | Matsui | 123/270 |
| 4,662,331 | 5/1987 | Ogawa et al. | 123/220 |
| 4,676,207 | 6/1987 | Kawamura et al. | 123/270 |

Primary Examiner—Raymond A. Nelli
Attorney, Agent, or Firm—Ernest A. Beutler

[57] ABSTRACT

A number of embodiments of combustion chamber configurations for internal combustion engines as applied as power units for outboard motors. In each embodiment, the combustion chamber comprises a main open volume in which combustion is initiated and into which fuel is discharged by a fuel injection nozzle. An energy cell, of smaller volume, is disposed so as to receive some of the fuel discharged by the injection nozzle and for creating combustion at the end of the combustion cycle to cause a pressure increase that discharges a hot charge into the main combustion volume for completing combustion. The energy cell is formed from a ceramic material. Both two and four-cycle applications and variations of combustion chamber configurations are disclosed.

13 Claims, 8 Drawing Sheets

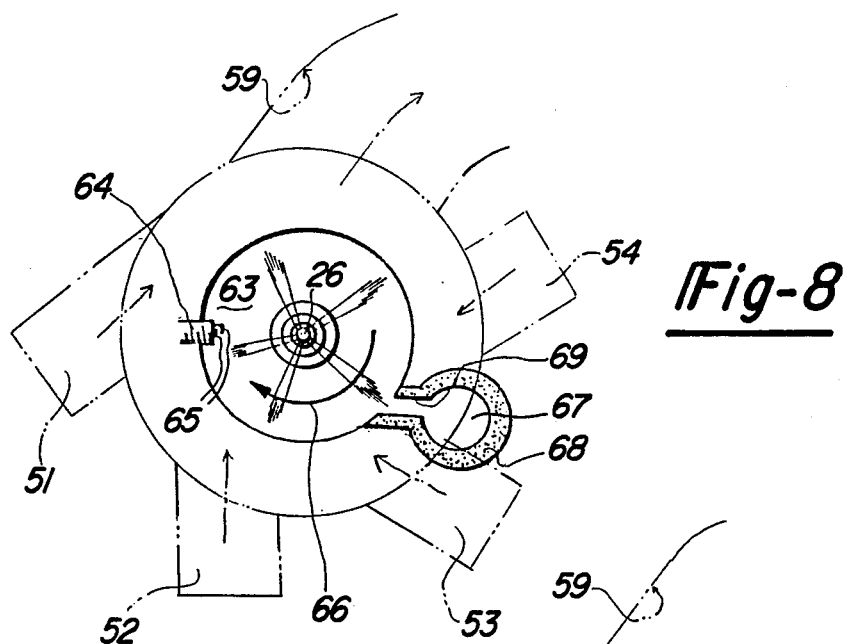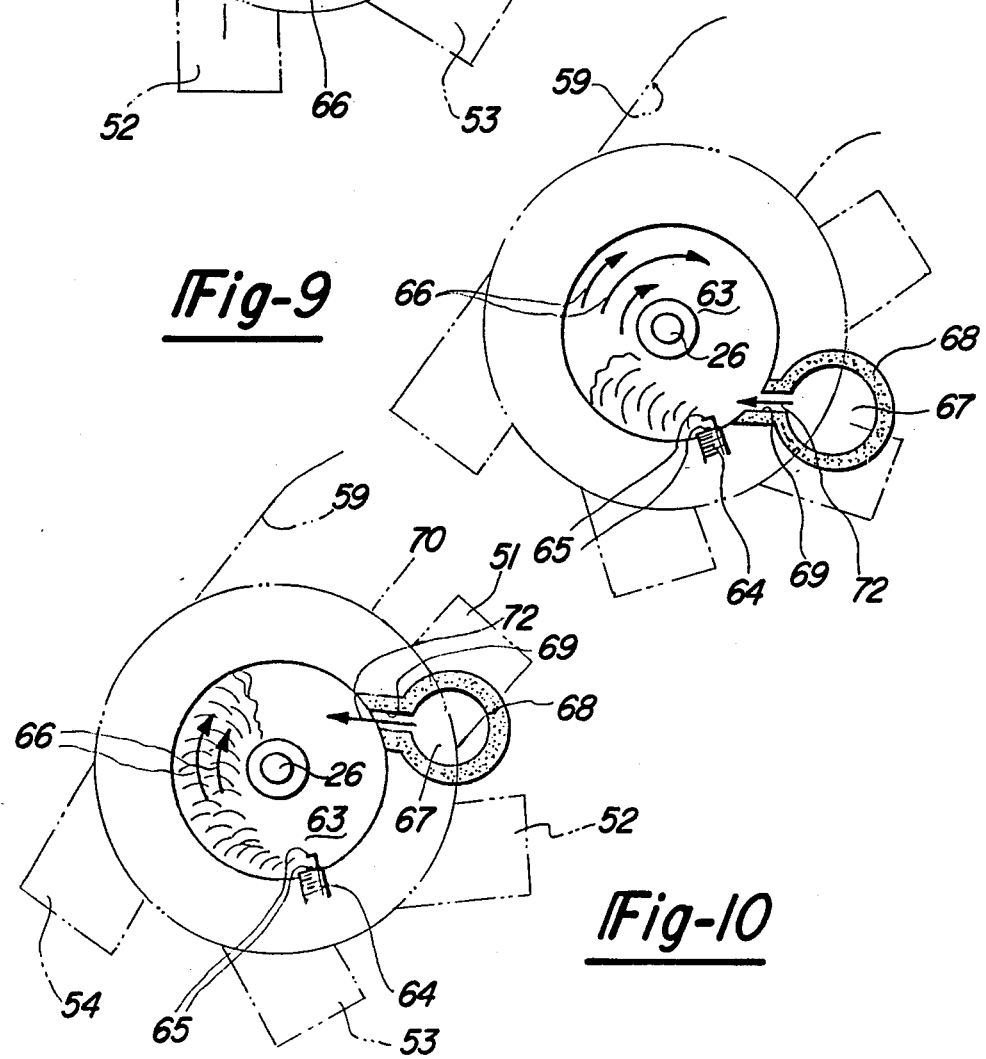

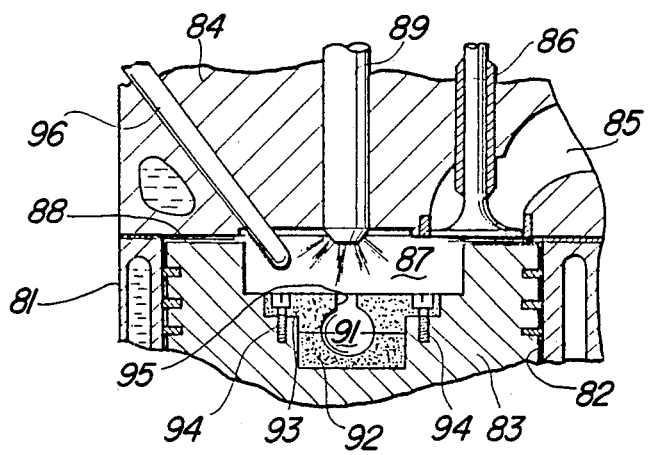
Fig-11
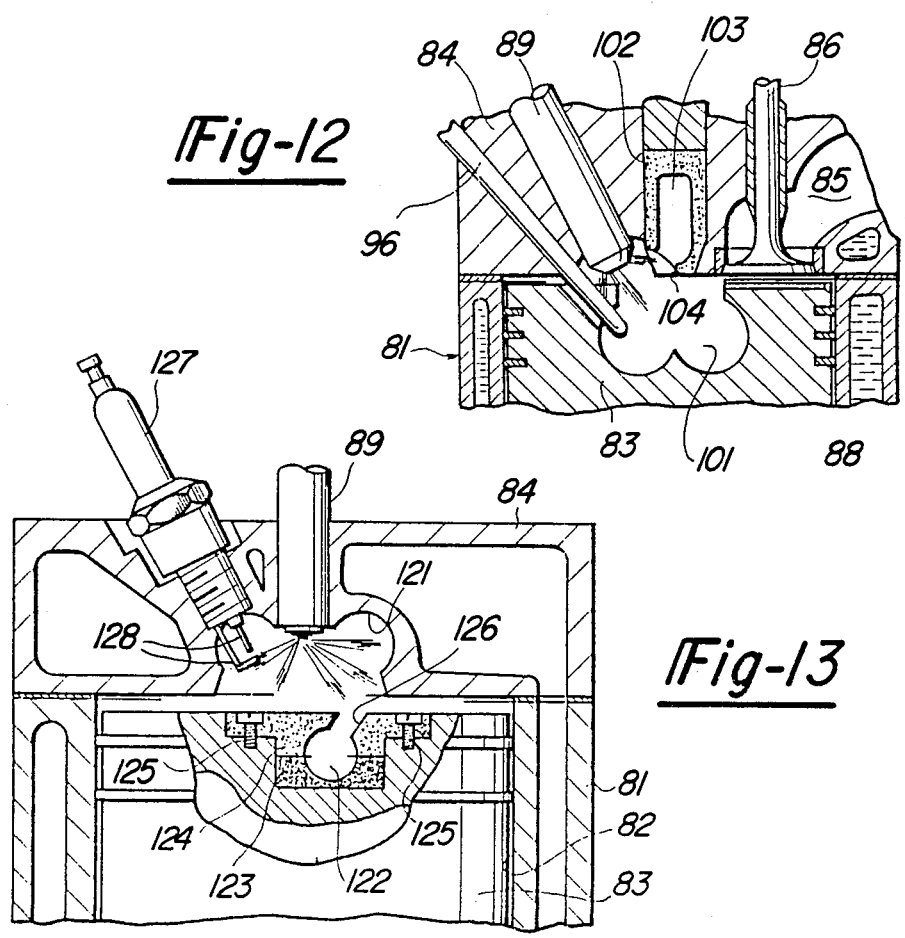
Fig-12
Fig-13

INTERNAL COMBUSTION ENGINE

BACKGROUND OF THE INVENTION

This invention relates to an internal combustion engine and, more particularly, to an improved combustion chamber configuration and construction for permitting the operation of the engine on a modified diesel cycle with a lower-than-normal compression ratio.

The advantages of diesel engines in connection with both fuel economy and their ability to operate on lower cost fuels than spark ignited engines are well know. However, because of the high-compression ratio employed with conventional diesel engines, the attendant weight of the engine has limited their applicability for many purposes. For example, a diesel engine has advantages for use in connection with outboard motors wherein the aforenoted fuel economy advantages would be particularly useful. However, the weight of a conventional diesel engine makes it unsuitable for normal outboard motor applications.

In order to permit the use of lower compression ratio engines operating on modified diesel cycles it has been proposed to form the combustion chamber with an energy cell which communicates with the main combustion chamber and in which combustion occurs at the end of the combustion cycle. The burning charge in the energ cell is ejected into the main combustion chamber at a high velocity and effects complete burning of the charge within the chamber so as to permit the operation of the engine on lower compression ratios than normally are employed with diesel engines. An embodiment of such an engine is shown in the co-pending application entitled "Turbulence Generator for Two-Stroke Spark Assisted Diesel Engines", Ser. No. 846,905, filed Apr. 11, 1986 in the name of Susumu Ariga, and assigned to the assignee of this application. That arrangement has particular utility and has been found to permit the operation of an engine on the modified diesel cycle with a substantially lower compression ratio than is normally used with diesel engines. That is, it is possible to operate the engine embodying the combustion chamber as shown in that application with compression ratio substantially less than 17:1 and in the range of about 12 to 13:1.

It is an object of this invention to provide further improvements in combustion chamber configurations and constructions for engines operating on modified diesel cycles with lower-than-normal compression ratios employed with pure diesel engines.

It is a further object of this invention to provide a combustion chamber configuration and construction which will permit operation of an engine on a modified diesel cycle with a substantially lower-than-normal compression ratio and which will have high degrees of combustion efficiency and which will ensure complete combustion within the combustion chamber during each cycle of operation.

SUMMARY OF THE INVENTION

This invention is adapted to be embodied in a compression ignition internal combustion engine comprised of a cylinder having a cylinder bore, a piston reciprocating in the cylinder bore and a cylinder head that is affixed to the cylinder and defines a combustion chamber. The combustion chamber is comprised of a substantially open volume surrounded by a restricted squish area formed by the cylinder head and piston when the piston is at top dead center. An energy chamber of smaller volume than the open volume communicates with the open volume. Injection nozzle means are incorporated for discharging fuel into the open volume and into the energy cell. The energy cell is formed from a material having a substantially lower thermal conductivity than the cylinder head and piston.

BRIEF DESCRIPTION OF THE DRAWINGS

FIG. 8 is a view looking in the direction of the line 8—8 of FIG. 2 and shows the configuration of the combustion chamber.

FIG. 9 is a view, in part similar to FIG. 8, showing another embodiment of the invention.

FIG. 10 is a view, in part similar to FIGS. 8 and 9, showing yet another embodiment of the invention.

FIG. 11 is a cross-sectional view, in part similar to a portion of FIG. 2, and shows a still further embodiment of the invention.

FIG. 12 is a cross-sectional view, in part similar to FIGS. 2 and 11, showing yet another embodiment of the invention.

FIG. 13 is a cross-sectional view, in part similar to FIGS. 2, 11 and 12 and shows yet another embodiment of the invention.

DETAILED DESCRIPTION OF THE PROPOSED EMBODIMENT

Figure 1:
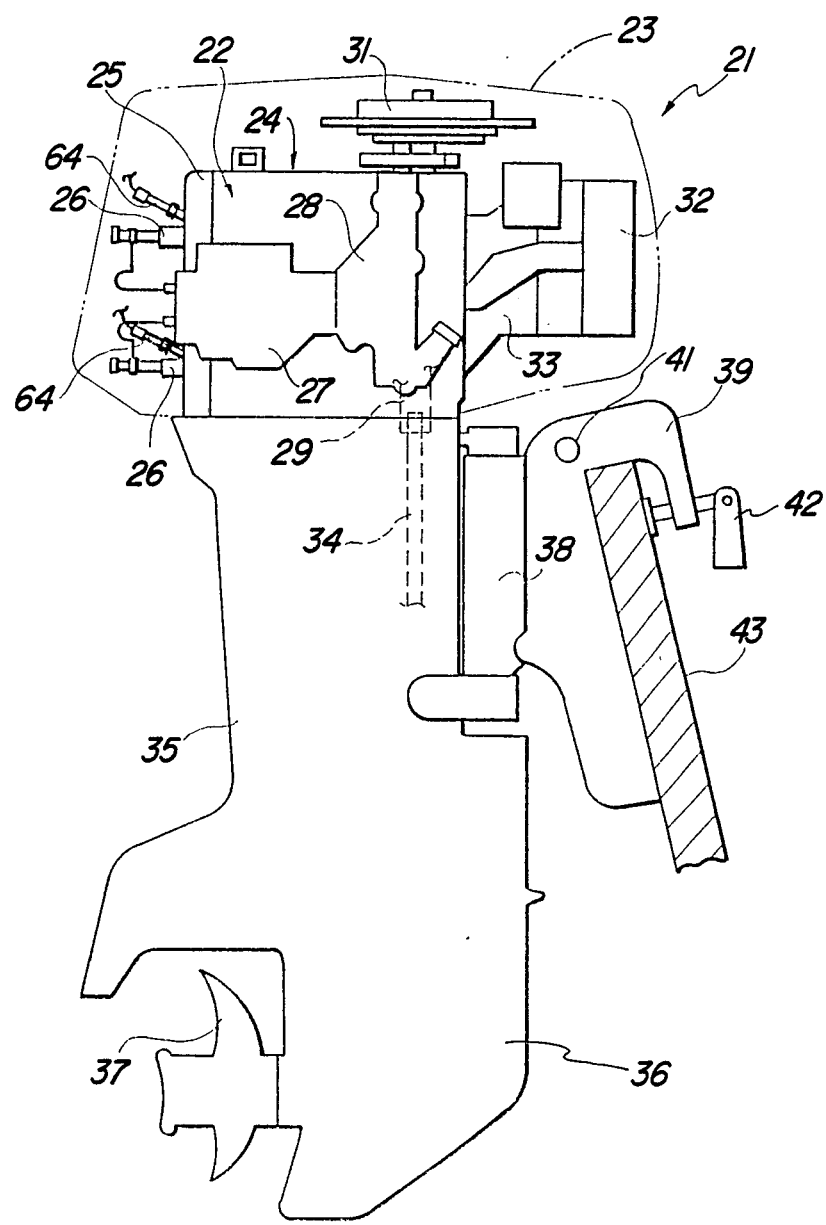
FIG. 1 is a side elevational view of an outboard motor constructed in accordance with an embodiment of the invention, with portions shown in phantom.

Referring now in detail to the drawings and initially to FIG. 1, an outboard motor constructed in accordance with an embodiment of the invention is identified generally by the reference numeral 21. The invention, as will become apparent, relates to the configuration and construction of a combustion chamber for an internal combustion engine and particularly one operating on a modified diesel cycle. Therefore, the depiction of the outboard motor 21 is intended merely to show a typical environment in which the invention may be employed. It should be noted, however, that the invention has particular utility in connection with outboard motors wherein the advantages of lightweight, low-compression ratio diesel engines are particularly advantageous.

The outboard motor 21 is comprised of a power head that includes an internal combustion engine, indicated generally by the reference numeral 22 and which is surrounded by a protective cowling, shown in phantom and identified by the reference numeral 23. The engine 22 may be of any configuration and is, in the illustrated embodiment, depicted as being of the two-cylinder in-line type. It is to be understood, however, that the invention may be practiced with engines of other cylinder numbers and other cylinder configurations.

The engine 22 is comprised of a cylinder block 24 to which a cylinder head 25 is affixed in a known manner. Fuel injection nozzles 26 are supported in the cylinder head 25 and there is, in the illustrated embodiment, one such fuel-injection nozzle for each cylinder of the engine. The fuel injection nozzles 26 receive a timed pressurized charge of fuel from a fuel injection pump 27 that is driven by means of a transfer drive 28 from the engine output shaft or crankshaft 29. The crankshaft 29, as is typical with outboard motor practice, rotates about a vertically extending axis and has a fly wheel 31 carried at its upper end.

In this embodiment, the engine 22 is of the crankcase compression two-cycle type. For this purpose, an inlet air charge, which is drawn through an air inlet silencing device 32, is delivered to the crankcase chambers of the engine, which will be described, through a manifold 33. The engine crankshaft 29 is rotatably coupled, in any suitable manner, to a driveshaft 34 which is rotatably journaled within a driveshaft housing 35 that is affixed to and depends from the powerhead of the motor 21. A lower unit 36 is supported beneath the driveshaft housing 35 and contains a forward-neutral-reverse transmission (not shown) that drives a propeller 37 in a known manner.

A steering shaft (not shown) is affixed to the driveshaft housing 35 and is rotatably journaled within a swivel bracket 38 for steering movement of the outboard motor 21 about a generally vertically extending axis. The swivel bracket 38 is affixed to a clamping bracket 39 by means of a pivot pin 41 for tilting movement of the outboard motor 21 relative to the clamping bracket 39 about a generally horizontally disposed pivot axis. The clamping bracket 39 carries a clamping means 42 for detachably affixing the outboard motor 21 to a transom 43 of an associated watercraft.

As has been noted, the invention relates to the construction of the combustion chamber for the engine 22 and for that reason, further details of the construction of the components of the outboard motor 21 are believed to be unnecessary.

Figure 2:
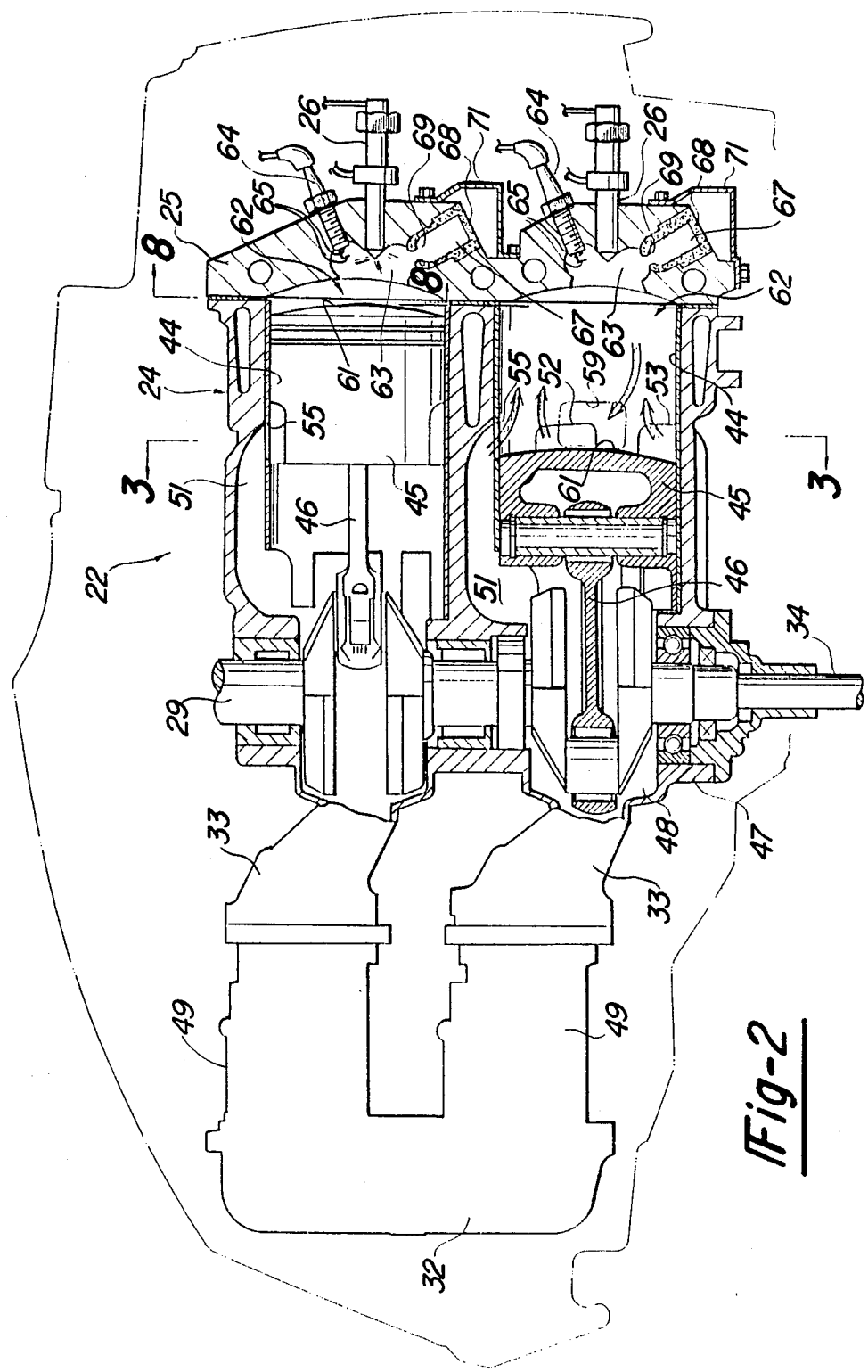
FIG. 2 is an enlarged cross-sectional view taken along a vertical plane and shows the engine of the outboard motor.
Figure 3:
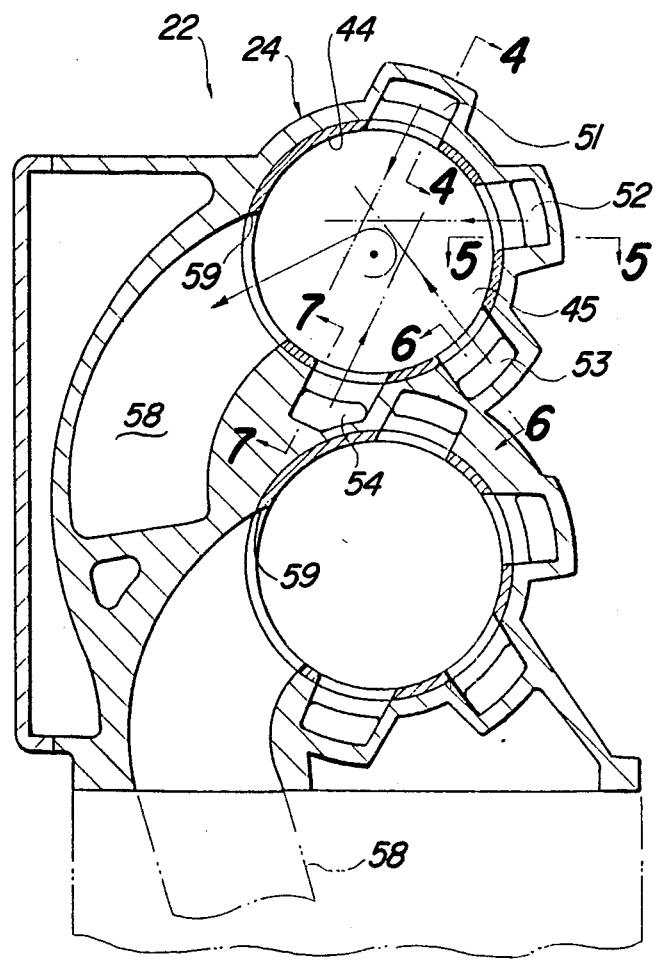
FIG. 3 is a cross-sectional view taken along the line 3—3 of FIG. 2.
Figure 4:
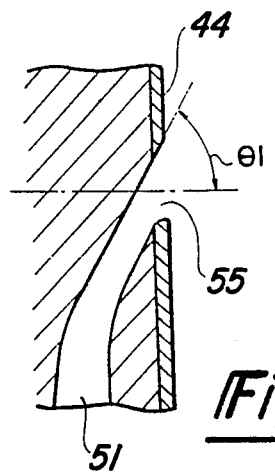
FIG. 4 is an enlarged cross-sectional view taken along the line 4—4 of FIG. 3.
Figure 5:
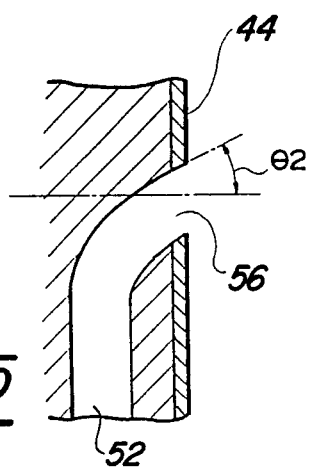
FIG. 5 is an enlarged cross-sectional view taken along the line 5—5 of FIG. 3.
Figure 6:
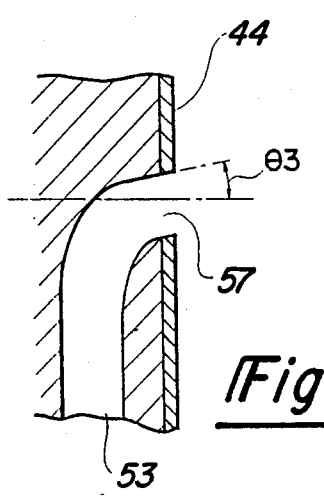
FIG. 6 is an enlarged cross-sectional view taken along the line 6—6 of FIG. 3.
Figure 7:
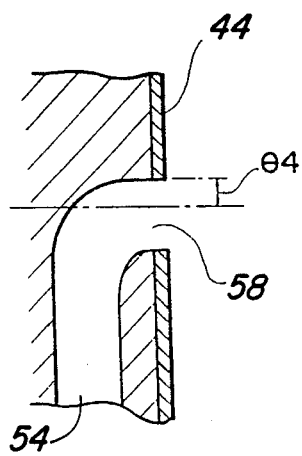
FIG. 7 is an enlarged cross-sectional view taken along the line 7—7 of FIG. 3.

Referring now primarily to FIGS. 2 through 8 and initially to FIG. 2, the detailed construction of the engine 22 will be described.

As has been noted, in the illustrated embodiment, the engine 22 is of the two-cylinder in-line type. For this reason, the cylinder block 24 is provided with a pair of cylinder bores 44 that are defined by cylinder liners that are suitably positioned within the cylinder block 24. The cylinder bores 44 extend horizontally and slidably support respective pistons 45. The pistons 45 are connected, by means of connecting rods 46, to the throws of the crankshaft 29. The crankshaft 29, as has been previously noted, is supported for rotation about a vertically extending axis. This rotational support is provided by means of the cylinder block 24 and a crankcase member 47 that is affixed in a suitable manner to the cylinder block 24. As has been noted, the engine 22 operates on a two-cylinder crankcase compression principle and to this end the individual crankcase chambers 48 defined by the crankcase 47 and cylinder block 24 are sealed from each other.

The air charge, which enters the individual crankcase chambers 48 from the manifolds 35, may be throttled by means of throttle valves (not shown) positioned in throttle valve bodies 49 that are interposed between the manifold 33 and the air inlet device 32.

The charge which is introduced to the crankcase chambers 48 is transferred upon descent of the pistons 45 from the crankcase chambers 48 to a combustion chamber, as to be described, by means of four circumferentially spaced transfer or scavenge passages 51, 52, 53 and 54 (FIGS. 3 through 7). The scavenge passages 51, 52, 53 and 54 open at their lower ends into the respective crankcase chambers 48. At their upper ends, the scavenge passages 51 through 54 terminate in respective scavenge ports 55, 56, 57 and 58. It will be noted from FIG. 3 that the scavenge ports 55, 56, 57 and 58 are circumferentially spaced around the cylinder bore 44 and the upper ends of the passages 51 through 54 and the ports 55 through 58 are inclined at decreasing angles, $\theta1$, $\theta2$, $\theta3$ and $\theta4$ relative to a horizontal plane. As a result, the intake charge delivered through the scavenge passage 51 will flow upwardly and in a circumferential direction while the flow from the remaining scavenge passages and scavenge ports will flow at reduced angles to the horizontal. This flow direction gives rise to a swirling motion within the combustion chamber, to be described, which swirling motions aids in the scavenging of the cylinder. Furthermore, there is a loop-type effect to the scavenging.

Positioned circumferentially between the scavenge passages 51 and 54 is an exhaust passage 58 that terminates in an exhaust port 59 that opens through the cylinder liner into the cylinder bore 44. The exhaust passage 58 and exhaust port 59 are configured so that the flow through the combustion chamber during scavenging will tend to increase or promote the rate of swirl and hence, will further improve the scavenging of the cylinder bores 44.

The pistons 45 have slightly domed heads 61 which may be formed as a surface of revolution and which cooperate with corresponding shaped recesses 62 formed in the cylinder head 25. A recess or main combustion chamber volume 63 is formed in the cylinder head 25 and may be either centrally disposed or offset relative to the cylinder bore axis. The main combustion chamber recess 63 is surrounded by a squish area which is formed when the piston head 61 is at its top dead center position as generally shown by the uppermost or top piston 45 in FIG. 2.

The recess 63 may have any suitable shape but preferably is defined by a surface of revolution and in this embodiment is disposed as being of toroidal configuration. Although the engine operates on a modified diesel cycle, in order to initiate ignition or to assist in the initiation of ignition, a spark plug 64 is provided with a spark plug gap 65 that is disposed within the combustion chamber volume 63. As will be described, the location of the spark gap 65 may be varied to serve the purposes of the invention. The spark plug 64 is fired by any suitable ignition circuit.

The engine, as has been noted, is designed to operate on a modified diesel principle and, unlike conventional diesel engines, operates with a substantially lower compression ratio than such engines. Preferably, the compression ratio is lower than about 17:1 and may be in the range of 12 to 13:1. As such, the compression ratio is only slightly greater than conventionally employed with spark ignition engines and hence, the engine 22 may be constructed so that its weight will be not significantly greater than that of a spark ignition engine.

As may be best seen in FIG. 8, the fuel injection nozzle 26 is of the multiple port discharge type and is disposed generally centrally of the axis of generation of the recess 63. As has been noted, the configuration of the scavenge passages 51 through 54 is such that they will generate a swirl in the combustion chamber and this swirl is indicated by the arrow 66. It has been found that with low-compression ratio diesel engines that there is a problem that the flame propogation is not sufficient to ensure full combustion of the entire fuel air charge in the combustion chamber.

In order to overcome this difficulty, there is provided an energy cell volume 67 formed from a body of a material having a substantially lower thermal conductivity of that of the cylinder head 25 and piston 45. Normally, the cylinder head 25 and piston 45 will be formed from aluminum or an aluminum alloy and the energy cell body 68 is preferably formed from a ceramic material. The energy cell volume 68 communicates with the main combustion chamber portion 63 through a relatively narrow throat 69. This throat 69 is disposed so that some of the fuel issuing from one of the ports of the fuel injection nozzle 26 will enter into the energy cell 67.

The operation of the engine is as follows. As the piston 45 begins its upward stroke, the swirl which has been generated will continue and the exhaust port closes approximately 100 to 90 degrees before top dead center. The air charge is thus compressed by the upward movement of the piston and the injection nozzle 26 starts to spray fuel into the combustion chamber. The timing and duration of the injection will depend upon engine load. For example, at low loads and low speeds, injection may begin at about 30 degrees before to dead center while at higher speeds and loads, the injection can begin earlier, for example, about 40 degrees before top dead center. The termination of injection will depend upon the load.

Because of the lower than normal compression ratio for a diesel engine, the initial fuel injection will not cause auto ignition within the combustion chamber. In order to initiate combustion, the spark plug 64 is fired at an appropriate time and before auto ignition begins. In an embodiment of the invention, the spark timing may be fixed and may be at 20 degrees before top dead center. Of course, the timing may be varied if desired. Once the spark plug 64 is fired, the combustion will begin and flame will propogate through the combustion chamber.

As the flame beings to propagate from the gap of the spark plug 64, there will be a pressure rise occur in the remaining portion of the combustion chamber, which pressure rise precedes the flame front. It should be noted that the injection nozzle 26 will discharge a spray into the combustion chamber that is stoichiometric at the spark gap at the time of firing but which will vary throughout the combustion chamber. In many areas the air/fuel ratio will be greater than stoichiometric and the overall fuel/air charge in the combustion chamber can be substantially greater than stoichiometric. This is possible because the engine, after initial firing of the spark plug 64, operates on a diesel combustion cycle.

Due to the pressure rise caused by the progressive flame front, the fuel/air mixture in the combustion chamber will auto ignite and the remaining combustion cycle will operate like diesel combustion.

The swirling motion which has been previously established will continue during this process and throughout the combustion cycle so as to aid in the distribution of fuel throughout the combustion chamber and also in the flame propogation. As the combustion proceeds through the main combustion chamber 63, the pressure in the energy cell 67 will become elevated and due to this and the higher temperature of the energy cell former 68, there will become auto-ignition in the energy cell 67. The ignited gases will expand rapidly and pass through the throat 69 into the main combustion chamber 63 and will effect ignition of the fuel/air mixture at this point. This will ensure that there will be complete combustion of the fuel/air mixture in the entire combustion chamber.

In order to provide protection for a user servicing the engine, heat shield 71 may be affixed to the cylinder head 25 and overlie the energy cell body 68.

As may be seen in FIG. 8, in this embodiment, the spark plug gap 65 is circumferentially spaced from the throat 69 of the energy cell 67 in the direction of swirl 66. In some arrangements, it may be desirable to position the spark plug gap 65 more closely to the energy cell throat 69 and FIG. 9 shows such an embodiment. This embodiment differs from the previously described embodiment only in the location of the spark gap 65. As will be seen, when the spark plug 65 is fired, the combustion will progress along a flame front in the same direction as the direction of swirl 66. Hence, the energy cell volume 67 is disposed at the trailing edge of this flame front and it will be ensured that the ignition caused by the exit of the hot combustion gases from the energy cell throat 69 will occur at a point to insure that all of the fuel in the combustion chamber will be burned.

FIG. 10 shows another embodiment of the invention. The main construction of the engine in this embodiment is the same as that of the previously described embodiments and for that reason, only the plan view of the combustion chamber is necessary to understand the construction and operation of this embodiment. The mechanical components have been identified by the same reference numerals as employed in the previously described embodiments. In the embodiments previously illustrated and described, the throat 69 of the energy cell was directed in the same direction as the direction of swirl 66 so as to add to and promote the swirl. In this embodiment, the throat 69 of the energy cell is disposed in opposing relationship to the direction of swirl 66. As a result, when the flame front 70 progresses toward the energy cell and causes ignition within the energy cell 67, the gases flowing from the energy cell 67 will be directed in the direction indicated by the arrow 72 so as to oppose this flow and create turbulence. In some embodiments, this may be desirable and may result in more complete combustion.

In the embodiments of the invention as thus far described, the engine has operated on the two-stroke crankcase compression cycle. However, the inventional also may be practiced in conjunction with four-cyle engines and FIG. 11 shows such an embodiment. In this embodiment, the cylinder block is indicated at 81 and defines a cylinder bore 82 in which a piston 83 is supported for reciprocation. A cylinder head 84 is affixed to the cylinder block 81 in any known manner. Only the construction of the cylinder block 81, piston 83 and cylinder head 84 are necessary to understand the construction of this embodiment since it differs from the previous embodiment only in the configuration of the combustion chamber. In addition, there is provided an intake port 85 that extends through the cylinder head 84 and which has its port opened and closed by an intake valve 86 that is operated in any known manner. In addition, the cylinder head 84 is formed with an exhaust port and a controlling exhaust valve (not shown).

In this embodiment, the main combustion chamber volume is formed by a recess 87 formed in the head of the piston 83. The recess 87 is preferably in the shape of a surface of revolution and in the embodiment of FIG. 11 this recess 87 has a right circular cylindrical configuration. The recess 87 is centrally disposed and is surrounded by a squish area 88 that is formed by the remaining portion of the head of the piston 83 and an opposing surface of the cylinder head 84.

A fuel injection nozzle 89 is supported within the cylinder head 84 centrally of the main combustion chamber recess 87 and, like the previously described embodiments, is of the multi-port type.

In this embodiment, an energy cell volume 91 is formed within the head of the piston 83 by means of an insert comprised of a lower ceramic member 92 and an upper ceramic member 93. The members 92 and 93 are held in place relative to the head of the piston 83 in any suitable manner as by means of fasteners 94. The energy cell 91 communicates with the main combustion chamber recess 87 through a restricted throat 95. The configuration and orientation of the throat 95 may be in any direction so as to produce the desired result; however, the throat 95 is disposed so that fuel will enter the energy cell 91 during the injection cycle. In this embodiment, ignition is promoted by means of a glow plug 96 that is supported in any suitable manner in the cylinder head 84 and which projects into the recess 87.

FIG. 12 shows another embodiment of the invention as applied to a four-cycle engine. In this embodiment, the main components of the engine are the same as the previously described embodiment and for that reason, these components have been identified by the same reference numerals.

In this embodiment, a main combustion chamber volume 101 is formed in the head of the piston 83 and has the shape of a surface of revolution. In this embodiment, the volume 101 has a toroidal shape.

An energy cell 102 is formed by a ceramic insert that is fixed into the cylinder head 84 in a known manner and which defines an energy cell volume 103 that communicates with the main combustion chamber volume 101 through a throat 104. The fuel injection nozzle 89, like the previously described embodiments, is configured so as to spray a portion of its discharge into the energy cell volume 103 through the throat 104. Again, a glow plug 96 is carried by the cylinder head 84 and extends into the recess 101 so as to promote ignition.

Yet another embodiment of the invention is shown in FIG. 13 and like the embodiments of FIGS. 11 and 12, this embodiment employs the same basic engine components as previously described. Components of the engine of this embodiment, which are the same as the embodiment of FIGS. 11 and 12, have been identified by the same reference numerals. In this embodiment, the main combustion chamber volume is formed by a recess 121 that has the shape of a surface of revolution and which is formed in the cylinder head 84. In this embodiment, the recess 121 has a toroidal configuration and a fuel injection nozzle 89 of a multiple port type is disposed centrally in the recess 121. An energy cell volume 122 is formed by a pair of ceramic inserts 123 and 124 that are fixed into the head of the piston 83 by fasteners 125. Like the previously described embodiments, the energy cell 122 communicates with the main combustion chamber volume 121 through a restricted throat or port 126 that may have the desired orientation.

In this embodiment, a spark plug 127 is disposed in the cylinder head 84 with its spark gap 128 at an appropriate position so as to assist in initiating ignition.

Figure 14:
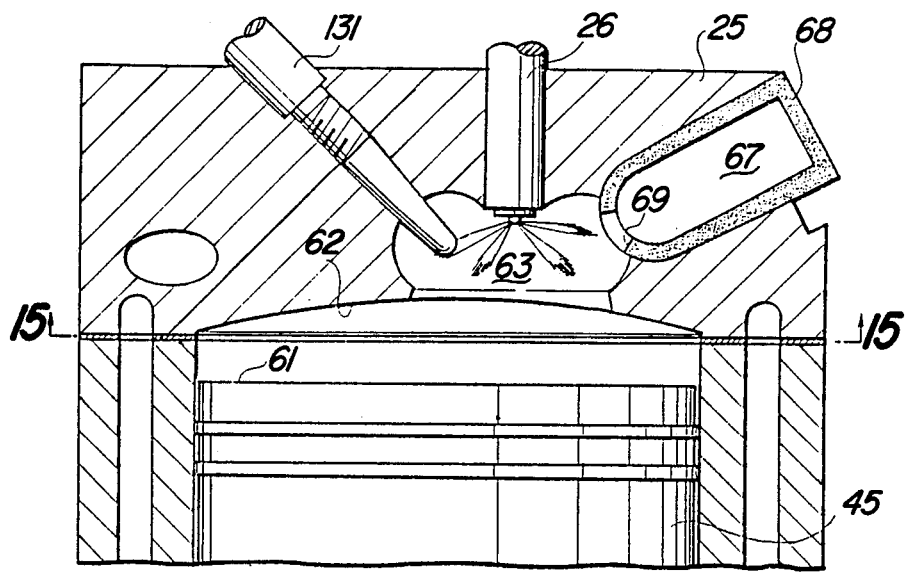
FIG. 14 is a cross-sectional view, in part similar to FIGS. 2, 11, 12 and 13 and shows another embodiment of the invention.
Figure 15:
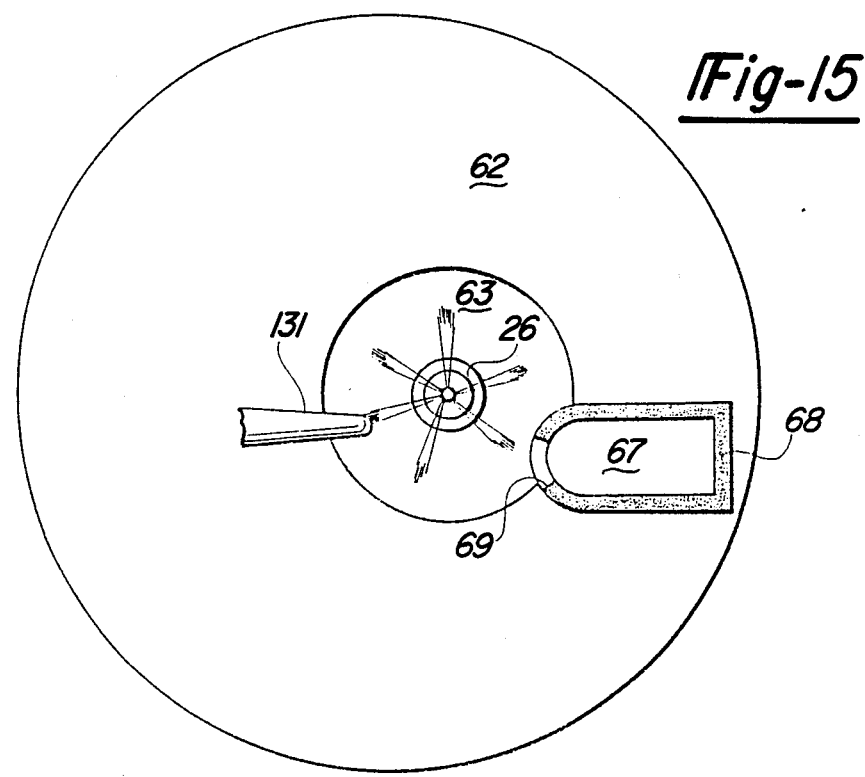
FIG. 15 is a view looking in the direction of line 15—15 of FIG. 14.
Figure 16:
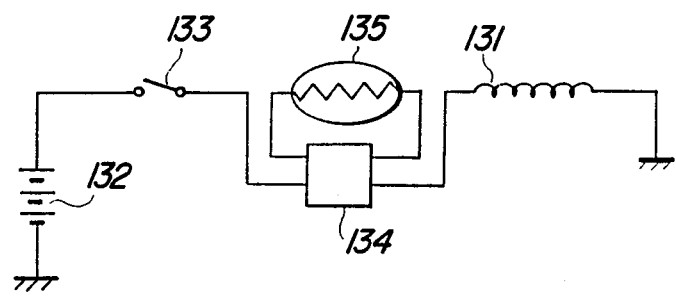
FIG. 16 is a schematic view of an arrangement showing how the combustion pressures can be controlled through the igniting means of the engine.

FIGS. 14 and 15 show yet another embodiment of the invention which is generally similar to the embodiments of FIGS. 11 through 13 and which may operate on either the two-cycle or four-cycle principle. The configuration of the combustion chamber of this embodiment is substantially the same as that of the embodiment of FIGS. 1 through 8 and thus the main components of this embodiment which have the same construction of that previously described embodiment have been identified by the same reference numerals and will be described again only insofar as is necessary to understand the construction and operation of this embodiment. In this embodiment, a glow plug 131 is supported within the cylinder head 25 and replaces the spark plug 64 of the embodiment of FIGS. 1 through 8. The glow plug 62 is, however, controlled by a circuit as indicated in FIG. 16 so as to limit the amount of heat energy which is necessary to be input into the glow plug and to limit the amount of energy consumption. The glow plug 131 receives electrical supply from a battery 132 through a main ignition switch 133. A controller, indicated generally by the reference numeral 134, controls the amount of energy supplied to the glow plug 131 in response to the load and temperature of the engine as indicated by a thermistor 135 which is in circuit with the control device 134. The thermistor 135 reduces the power supplied to the glow plug 131 under conditions of high load or high engine speed and thus prevents unnecessary heating of the glow plug 131.

Figure 17:
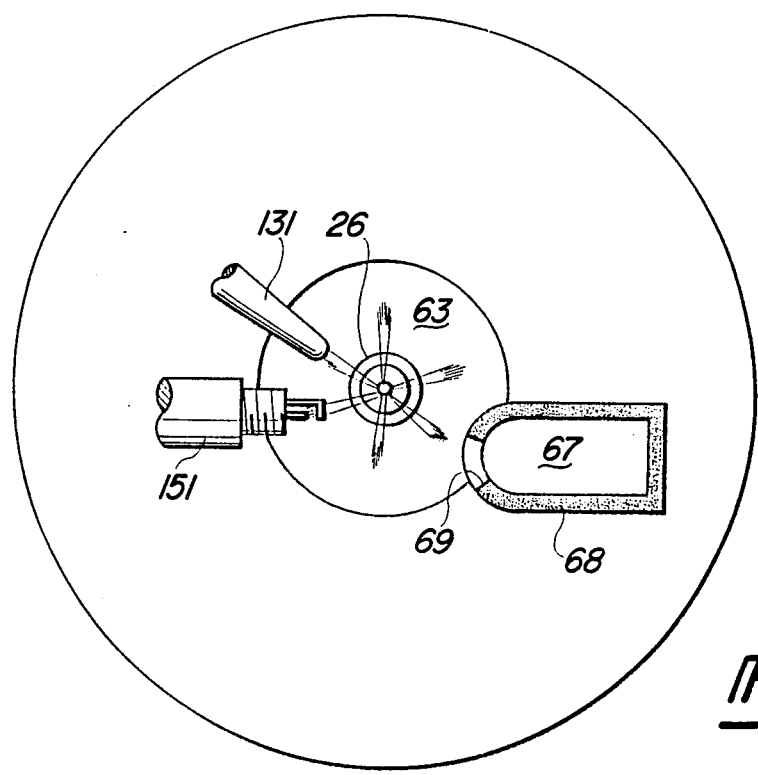
FIG. 17 is a view, in part similar to FIG. 15, showing the physical embodiment of the circuit diagram of FIG. 17.

FIG. 17 shows another embodiment of the invention which is substantially the same as the embodiments of FIGS. 14 through 16. In this embodiment, a spark plug 151 is employed in addition to the glow plug 131. In all other regards, this embodiment is the same as the previously described embodiments and, for that reason, further discussion of it is believed to be unnecessary.

It should be readily apparent from the foregoing description that a number of embodiments of the invention have been illustrated and described and each of which is effective in providing a low-compression ratio modified diesel engine that has efficient and complete combustion. This efficient and complete combustion is insured by means of an energy cell in which combustion occurs at the end of the combustion cycle in the main combustion chamber to emit a hot stream of gases that will burn the remaining unburned fuel/air charge in the main combustion chamber. This energy cell is formed from a ceramic material to insure its heat retention and good operation. Although a number of the embodiments of the invention have been illustrated and described, various changes and modifications may be made without department from the spirit and scope of the invention, as defined by the appended claims.

We claim:

1. In a compression ignition internal combustion engine comprising a cylinder having a cylinder bore, a piston reciprocating in said cylinder bore, and a cylinder head fixed relative to said cylinder to define a combustion chamber, said combustion chamber being comprised of a substantially open volume surrounded by a restricted squish area formed by said piston and said cylinder head when said piston is at top dead center, an energy cell of smaller volume than said open volume and communicating therewith, and injection nozzle means for discharging fuel into said open volume and into said energy cell, said energy cell being formed from a material having a substantially lower thermal conductivity than said cylinder head and said piston for retaining heat within said energy cell and means for initiating combustion in the open volume.

2. In a compression ignition internal combustion engine as set forth in claim 1 wherein the energy cell is carried by the cylinder head.

3. In a compression ignition internal combustion engine as set forth in claim 2 wherein the energy cell is formed from a ceramic material.

4. In a compression ignition internal combustion engine as set forth in claim 1 wherein the energy cell is formed in the piston.

5. In a compression ignition internal combustion engine as set forth in claim 4 wherein the energy cell is formed from a ceramic material.

6. In a compression ignition internal combustion engine as set forth in claim 1 wherein the means for initiating combustion comprises a spark plug.

7. In a compression ignition internal combustion engine as set forth in claim 1 wherein the means for initiating combustion comprises a glow plug.

8. In a compression ignition internal combustion engine as set forth in claim 1 further including means for inducing a swirl in the combustion chamber.

9. In a compression ignition internal combustion engine as set forth in claim 8 wherein the energy cell discharges into the open volume in a direction to aid the swirl.

10. In a compression ignition internal combustion engine as set forth in claim 9 wherein the means for initiating combustion is disposed adjacent the energy cell.

11. In a compression ignition internal combustion engine as set forth in claim 10 wherein the means for initiating combustion is displaced relative to the energy cell in the direction of swirl.

12. In a compression ignition internal combustion engine as set forth in claim 9 wherein the means for initiating combustion is displaced from the energy cell.

13. In a compression ignition internal combustion engine as set forth in claim 8 wherein the energy cell is disposed so as to discharge into the open volume in a direction opposing the direction of swirl for introducing turbulence.

* * * * *